United States Patent
Nagasaki et al.

(10) Patent No.: US 7,270,774 B2
(45) Date of Patent: Sep. 18, 2007

(54) PHOSPHOR HAVING RESISTANCE TO DETERIORATION CAUSED BY ULTRAVIOLET RAYS, AND GAS DISCHARGE DISPLAY DEVICE OF WHICH IMAGE QUALITY IS NOT READILY DETERIORATED OVER TIME

(75) Inventors: Yoshihisa Nagasaki, Hirakata (JP);
Seigo Shiraishi, Neyagawa (JP);
Masahiro Sakai, Yawata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 371 days.

(21) Appl. No.: 11/130,905

(22) Filed: May 17, 2005

(65) Prior Publication Data

US 2005/0263742 A1    Dec. 1, 2005

(30) Foreign Application Priority Data

May 26, 2004   (JP)   ............................. 2004-156499

(51) Int. Cl.
*C09K 11/59* (2006.01)

(52) U.S. Cl. ................................ 252/301.6 F; 313/486
(58) Field of Classification Search ......... 252/301.6 F; 313/486
See application file for complete search history.

(56) References Cited

U.S. PATENT DOCUMENTS

2004/0239245 A1 * 12/2004 Kawamura et al. ......... 313/582

FOREIGN PATENT DOCUMENTS

| JP | 2000282029 | 10/2000 |
| WO | WO 99/28409 | 6/1999 |
| WO | WO 2005/031785 | 4/2005 |

* cited by examiner

*Primary Examiner*—C. Melissa Koslow

(57) ABSTRACT

A manganese-activated zinc silicate phosphor according to the present invention satisfies $0<\beta-\alpha\leq0.5$ and $1.7\leq\beta$, where a value $\alpha$ is a ratio of a number of zinc atoms to a number of silicon atoms in a surface region of a phosphor particle, including a surface of the phosphor particle and a vicinity thereof, and a value $\beta$ is a ratio of a number of zinc atoms to a number of silicon atoms in a whole of the phosphor particle.

6 Claims, 4 Drawing Sheets

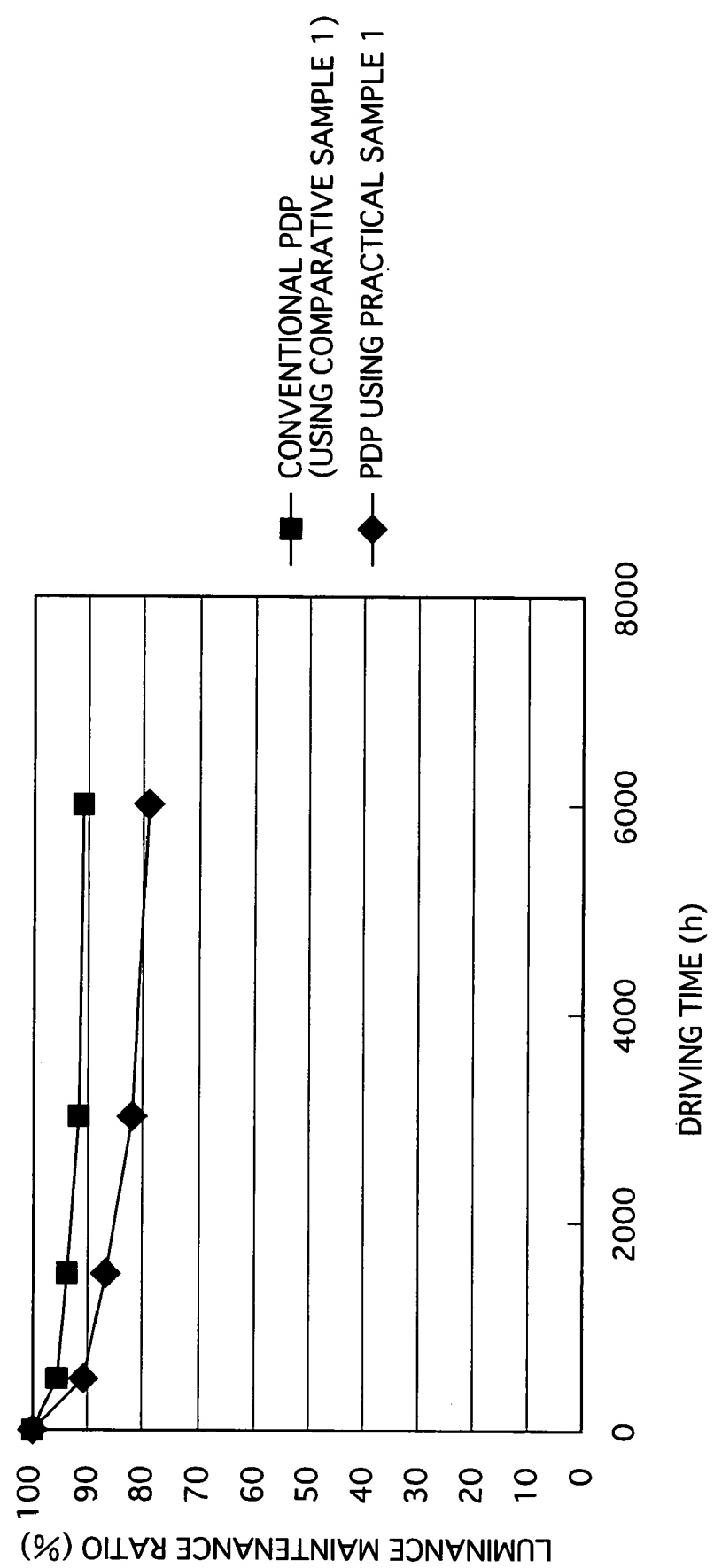

PHOSPHOR HAVING RESISTANCE TO DETERIORATION CAUSED BY ULTRAVIOLET RAYS, AND GAS DISCHARGE DISPLAY DEVICE OF WHICH IMAGE QUALITY IS NOT READILY DETERIORATED OVER TIME

BACKGROUND OF THE INVENTION (1) Field of the Invention

The present invention relates to a manganese-activated zinc silicate phosphor, and particularly relates to techniques for preventing the phosphor from being deteriorated by ultraviolet rays, and preventing the image quality of a gas discharge display device that uses the phosphor from being deteriorated over time.

(2) Description of the Related Art

A manganese-activated zinc silicate phosphor is commonly used as a green light emitting material for fluorescent lamps and plasma display panels (herein after called "PDPs"). The green light emitting material uses ultraviolet rays as an excitation light source. The manganese-activated zinc silicate phosphor is particularly often used for gas discharge display devices, such as the PDPs, because of its high color purity and high luminous efficiency.

The parent body of the manganese-activated zinc silicate phosphor, which is zinc silicate, is expressed by a general formula $Zn_2SiO_4$. The chemical composition of the manganese-activated zinc silicate phosphor is expressed by $Zn_{1.9}Mn_{0.1}SiO_4$. However, practically, the manganese-activated zinc silicate phosphor is used with excessive amounts of silicon compared to the stoichiometric composition to gain high luminous efficiency, as described in Phosphor Handbook (hereinafter called the "Document 1", edited by Keikotai Dogakukai (Phosphor Society), published by Ohmsha, Dec. 25, 1987, P 219-220).

Meanwhile, the manganese-activated zinc silicate phosphor is manufactured by dispensing and mixing a silicon source such as silicon dioxide, a zinc source such as zinc oxide, and a manganese source such as manganese carbonate so that the silicon component becomes excessive to some extent compared to the stoichiometric composition as described in the Document 1, and performing a heat treatment (baking process) at approximately 1200° C. in the natural atmosphere or the reduction atmosphere.

The heat treatment is performed in such a high temperature atmosphere, and therefore the zinc component is readily sublimated from the surface. As a result, compared to the chemical composition in the whole particle, the silicon becomes excessive in a region including the surface of the phosphor particle and the vicinity of the surface (This region is herein after called "the surface region"). A part of the silicon in the surface region is believed to exist as silicon dioxide.

By the way, the manganese-activated zinc silicate phosphor has a problem to be solved, that is, the luminous efficiency might be deteriorated over time, depending on the way it is used. To solve such a problem, Japanese Examined Patent Publication NO.H06-62944 (hereinafter called the "Document 2") discloses a technique for forming a silicon nitride compound layer on the surface of the phosphor particle.

In addition to the Document 2, Japanese Laid-open Patent Application No.2002-309248 (hereinafter called the "Document 3") tries to increase the resistance to the deterioration over time by adjusting the composition ratio in the whole phosphor particle, more specifically, the Mn/Zn atomic ratio and the Zn/Si atomic ratio in the whole particle.

The method disclosed by the Document 2 is effective in the case where an ultraviolet ray with a comparatively long wavelength generated from mercury is used, like in the case of a fluorescent lamp. However, it can not sufficiently reduce the deterioration over time in the case where ultraviolet rays having a short wavelength and high energy is used as the excitation light, like in the case of the PDPs.

The method disclosed by the Document 2 has another problem as well, that is, if a compound layer other than the manganese-activated zinc silicate phosphor is formed on the surface of the phosphor particle, the ultra violate ray, which is the excitation light, and the visible light generated by the light emission might be absorbed by the compound layer, and this greatly deteriorates the luminous efficiency.

Meanwhile, the inventors manufactured several trial models of the phosphor according to the Document 3 for each of which the composition ratio in the whole phosphor particle is modified, and the inventors found that it is difficult to reduce the deterioration over time and the phosphor of the Document 3 is not practical.

The inventors found the following facts by a keen examination.

(1) In the phosphor particle, mainly the surface region of the particle contributes to the light emission.

(2) The composition ratio in the whole phosphor particle does not necessarily equal to the composition ratio in the surface region of the particle.

In other words, the inventors found that simply adjusting the elemental composition ratio in the whole particle is not enough to control and stabilize the elemental composition ratio in the particulate surface region of the particle, which contributes to the light emission.

SUMMARY OF THE INVENTION

The first object of the present invention is to solve the above-described problems, and therefore to provide a manganese-activated zinc silicate phosphor in which the luminance of the emitted light is maintained at the conventional level and the deterioration of the phosphor over time is reduced. The second object of the present invention is to provide a gas discharge display device in which the luminance is maintained at the conventional level and the phosphor is not readily deteriorated over time.

The first object is fulfilled by a manganese-activated zinc silicate phosphor, wherein $0<\beta-\alpha\leq 0.5$ and $1.7\leq\beta$, where a value $\alpha$ is a ratio of a number of zinc atoms to a number of silicon atoms in a surface region of a phosphor particle, including a surface of the phosphor particle and a vicinity thereof, and a value $\beta$ is a ratio of a number of zinc atoms to a number of silicon atoms in a whole of the phosphor particle.

It would appear that the deterioration of the phosphor over time is caused by that the zinc component in the surface region is sublimated, evaporated, or eliminated at the time of absorbing the vacuum ultraviolet light, and the Zn/Si ration in the surface region decreases. For reducing the deterioration of the phosphor over time, the composition in the surface region, namely, the elemental composition ratio in the surface region is important.

This is because impurities are easily absorbed in $SiO_2$ (hereinafter called "silica") formed on the surface of the phosphor particle, and with the effect of the ion bombardment at the time of absorbing the ultraviolet rays, the physical deterioration begins on the surface of the phosphor particle. This fact was found by the inventors.

The inventors also found that the Zn/Si ratio in the surface region of the conventional manganese-activated zinc silicate phosphor is small, which means that the ratio of Si is large, the Zn/Si is easily changed with the light emission, and the deterioration is easily caused.

Accordingly, the inventors believe that it is very important to stabilize the Zn/Si ratio in the surface region in case the surface region is affected by the ion bombardment, and make the structure of the surface region to be not easily deteriorated, in order to reduce the luminance deterioration of the phosphor over time.

As described above, by satisfying $0<\beta-\alpha\leq 0.5$, the Zn/Si ratio in the surface region ($\alpha$) becomes close to the Zn/Si ratio in the whole particle ($\beta$), and the concentration gradient from the surface to the center of the phosphor particle becomes small. Therefore, the change in the surface Zn/Si ratio caused by the diffusion phenomena is suppressed. As a result, the composition in the surface region of the phosphor particle, namely, the elemental composition ratio becomes stable. In other words, a local time-lapse change in the elemental composition of the phosphor particle ratio becomes smaller.

Furthermore, by satisfying $1.7\leq\beta$, in other words, by achieving the value $\beta$ close to 2, which is the stoichiometric composition ratio, the composition becomes homogeneous. As a result, the phosphor becomes resistant to the deterioration and the Zn/Si ratio in the surface region becomes more stable.

Achieving the value $\beta$ close to the stoichiometric composition ratio does not introduce any factor for the deterioration of the luminance. Therefore, this is effective for reducing the deterioration of the phosphor over time with maintaining the luminance.

Here, it is preferable that the value $\alpha$ is obtained by X-ray photoelectron spectroscopy using AlK$\alpha$ X-ray radiation, and the value $\beta$ is obtained by inductively coupled plasma atomic emission spectrometry.

The methods for obtaining the values $\alpha$ and $\beta$ are defined as described above. The accuracy of the values $\alpha$ and $\beta$ is to be improved by fixing the measuring methods, and therefore reproducibility of the above-described effect is to be improved.

Here, the surface region is up to 4 nm in depth from the surface.

The reproducibility of the above-described effect is to be improved by defining the value $\alpha$ so as to correspond to the range in which the sublimation, the evaporation or the elimination of the zinc component, which is the cause of the deterioration of the phosphor over time, is prominent at the time of absorbing the vacuum ultraviolet light.

Here, it is preferable that $\beta-\alpha\leq 0.3$.

With the stated relation, the Zn/Si ratio in the surface region ($\alpha$) becomes further close to the Zn/Si ratio in the whole particle ($\beta$), and the concentration gradient from the surface to the center of the phosphor particle becomes further small. Therefore, the change in the surface Zn/Si ratio caused by the diffusion phenomena is suppressed. As a result, the composition in the surface region of the phosphor particle becomes stable. In other words, a local time-lapse change in the elemental composition of the phosphor particle ratio becomes further smaller.

Here, it is preferable that $\beta\leq 2.0$.

With the stated relation, the value $\beta$ becomes further close to 2, which is the stoichiometric composition ratio, the composition becomes more homogeneous. As a result, the phosphor becomes more resistant to the deterioration and the Zn/Si ratio in the surface region becomes more stable.

The second object is fulfilled by a gas discharge display device comprising a green phosphor, wherein the green phosphor includes a plurality of phosphor particles, at least some of the phosphor particles are manganese-activated zinc silicate phosphor particles, and $0<\beta-\alpha\leq 0.5$ and $1.7\leq\beta$, where a value $\alpha$ is a ratio of a number of zinc atoms to a number of silicon atoms in a surface region of each manganese-activated zinc silicate phosphor particle, including a surface of the manganese-activated zinc silicate phosphor particle and a vicinity thereof, and a value $\beta$ is a ratio of a number of zinc atoms to a number of silicon atoms in a whole of the manganese-activated zinc silicate phosphor particle.

In the gas discharge display device with the stated structure, the deterioration of the image quality, such as the luminance of the green light, is not readily caused even if the display device is driven for a long time, because the display device uses the phosphor having resistance to the deterioration over time.

BRIEF DESCRIPTION OF THE DRAWINGS

These and the other objects, advantages and features of the invention will become apparent from the following description thereof taken in conjunction with the accompanying drawings which illustrate a specific embodiment of the invention.

In the drawings:

FIG. 4 shows a result of a driving test of PDPs that respectively use a phosphor particle according to an embodiment of the present invention and a conventional phosphor particle.

DESCRIPTION OF THE PREFERRED EMBODIMENT

Structure

1. Structure

Figure 1:
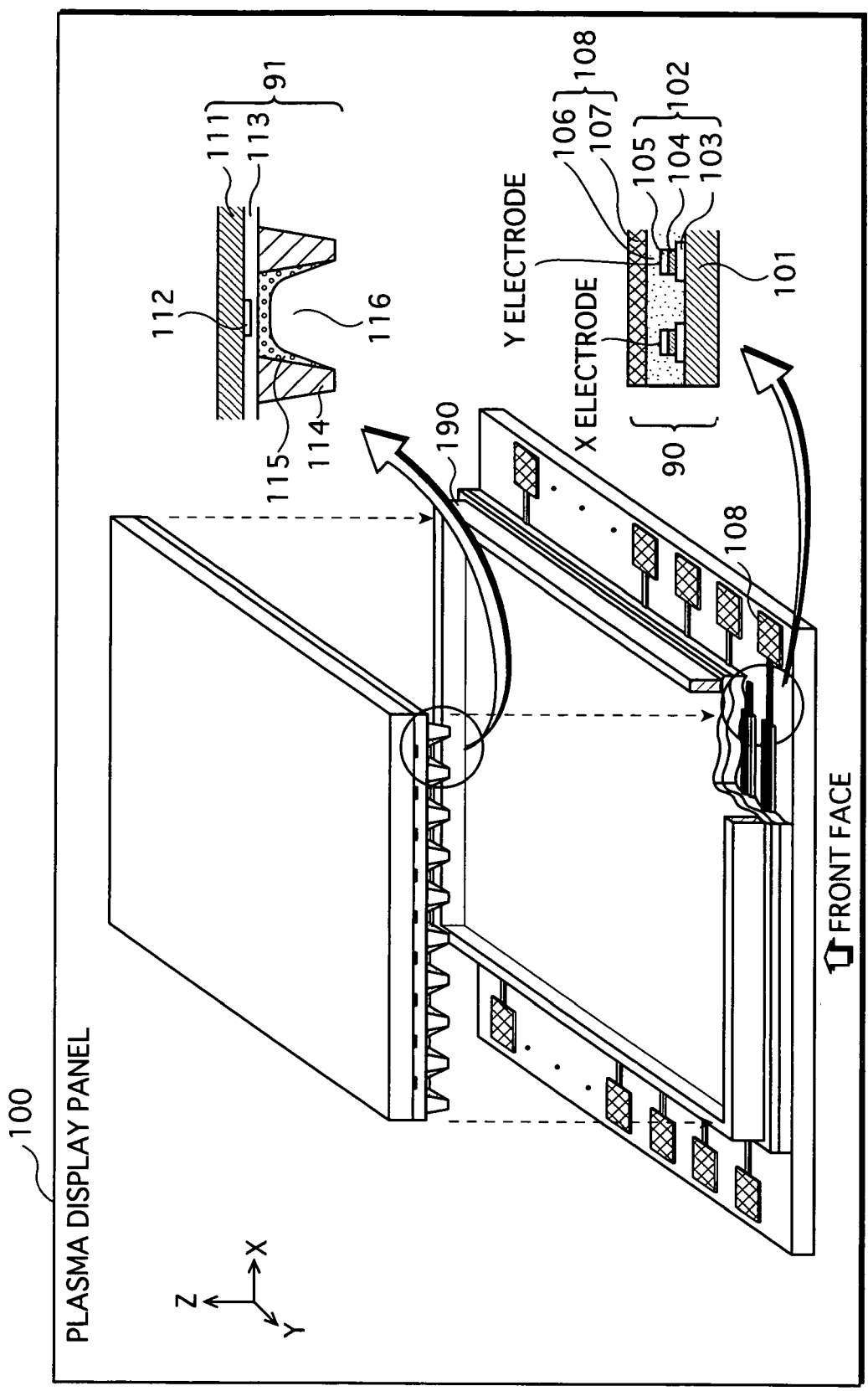
FIG. 1 is a schematic view of a PDP according to an embodiment of the present invention.

FIG. 1 is a schematic view of a PDP as an example of a gas discharge display device according to an embodiment of the present invention.

A PDP 100 is an alternate-current type (AC type) PDP. The PDP 100 includes a front plate 90 and a back plate 91. The main surfaces of those plates oppose each other.

The front plate 90 includes a front glass substrate 101, a display electrode 102, a dielectric layer 106, and a protective layer 107.

The front glass substrate 101 is a base for the front plate 90, and the display electrode 102 is formed on the front glass substrate 101.

The display electrode 102 includes a transparent electrode 103, a black electrode film 104, and a bus electrode 105.

The main component of the black electrode film 104 is ruthenium oxide, which takes on a black color. This prevents the reflection of outside light when viewed from the back side of the glass.

The bus electrode 105 is mainly composed of silver that has a high electric conductivity, and reduces the value of the resistance in the display electrode 102.

The bus electrode 105 has a terminal unit 108 at one end thereof. The terminal unit 108 is used for connecting the bus electrode 105 to a driving circuit, which is not illustrated.

Further, the display electrode 102 and the front glass substrate 101 are covered with the dielectric layer 106 and the protective layer 107.

The back plate 91 includes a back glass substrate 111, an address electrode 112, a dielectric layer 113, barrier ribs 114, and a phosphor layer 115 that is formed on a surface of a gap (hereinafter called "the barrier rib channel") between each adjoining two of the barrier ribs 114.

The following phosphors are used for instance as the light emitting material for the above-described phosphor layer 115.

Blue Phosphor $BaMgAl_{10}O_{17}$:Eu
Green Phosphor $Zn_2SiO_4$:Mn
Red Phosphor $YBO_3$:Eu The front plate 90 and the back plate 91 are put together as shown in FIG. 1, and sealed with a sealing glass 190 formed along the edges of them.

Within a discharge space 116, a discharge gas (an inner gas) that is constituted of rare gases, such as He, Xe and Ne, is enclosed at a pressure of 500 to 600 Torr (66.5 to 79.8 kPa).

An area where the one address electrode 112 crosses an adjoining pair (an X electrode and a Y electrode) of the display electrode 102 over the discharge space 116 is a cell that contributes to image display.

To perform an address discharge in such a PDP 100, a voltage is applied between the X electrode and the address electrode 112, which cross the cell to be lighted. After that, pulse voltages are applied to the X electrode and the Y electrode, which cross the cell, to perform a sustain discharge.

In the discharge space 116 of the PDP 100, an ultraviolet ray is generated by the sustain discharge. The generated ultraviolet ray (a resonance line having a central wavelength of approximately 146 nm) is converted into visible light at the phosphor layer 115, and the cell is thereby lighted and an image is displayed.

2. Characteristics of PDP 100 of Embodiment

In the PDP 100 of the embedment, the composition of the green phosphor particle included in the phosphor layer 115 is different from the conventional PDP.

Figure 2:
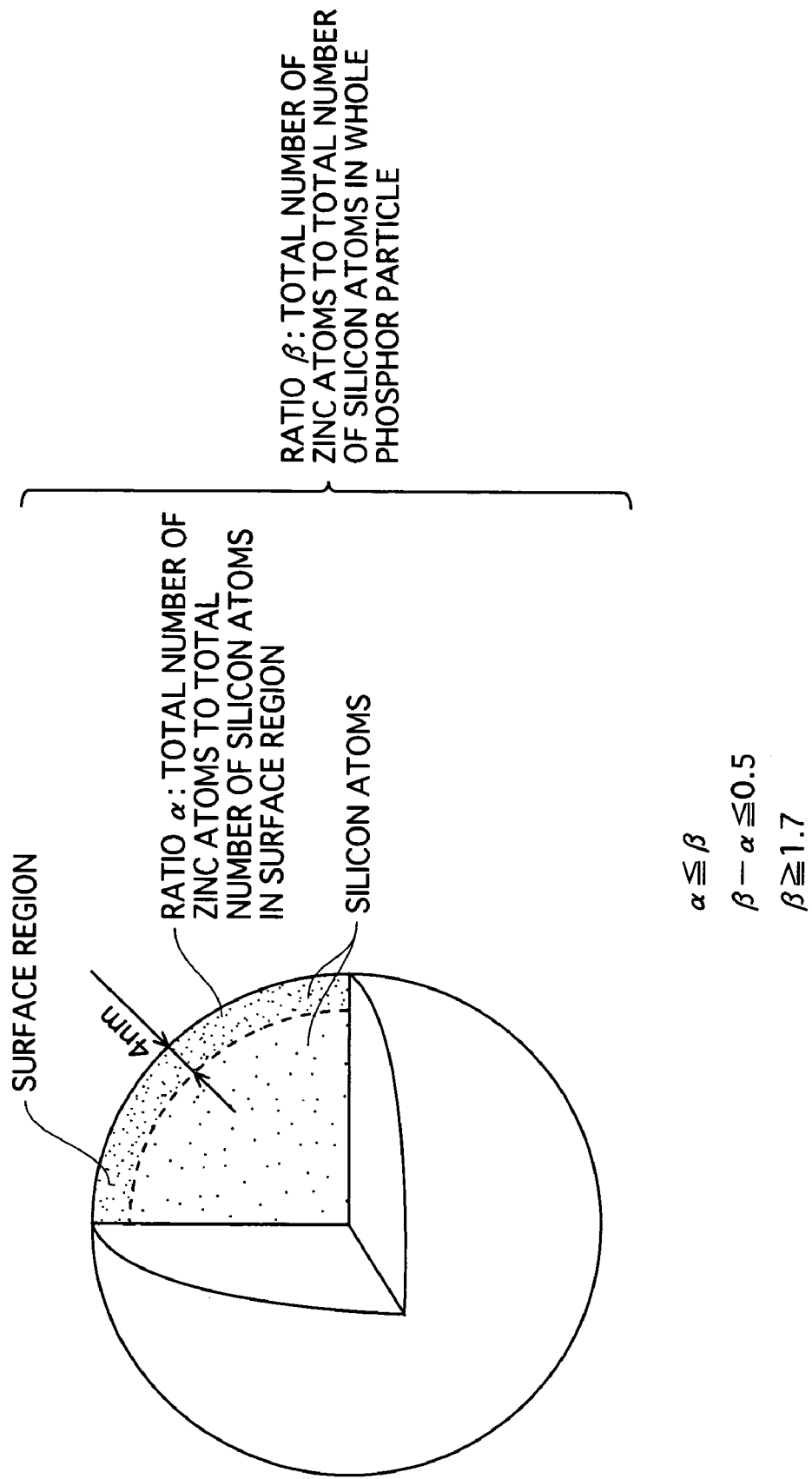
FIG. 2 is a schematic view of a phosphor particle according to an embodiment of the present invention.

More specifically, $0<\beta-\alpha\leq0.5$ and $1.7\leq\beta$ are satisfied as FIG. 2 shows, where α is the ratio of the total number of zinc atoms to the total number of silicon atoms in the surface region of the phosphor particle (hereinafter called the "surface Zn/Si ratio"), and β is the ratio of the total number of zinc atoms to the total number of silicon atoms in the whole phosphor particle (hereinafter called the "overall Zn/Si ratio").

Here, the surface region is up to 4 nm in depth from the surface of the particle.

Regarding the green phosphor particle of the conventional arts, the overall Zn/Si ratio is 1.92, and the surface Zn/Si ratio is 0.91. Therefore, the difference between those ratios is approximately 1.01. In contrast, regarding the green phosphor particle in the embodiment, the overall Zn/Si ratio is 1.91, and the surface Zn/Si ratio is 1.90. The difference between them is as small as approximately 0.01.

3. Basis for Determining Surface Zn/Si Ratio and Overall Zn/Si

Ratio

The inventors assumed that $SiO_2$ (hereinafter called "silica") formed on the surface of the conventional green phosphor accelerates the deterioration.

In other words, the inventors assumed that impurities in the discharge space are absorbed in the surface of the phosphor particle because silica exists on the surface of the phosphor particle, and with the effect of the ion bombardment, the physical deterioration begins on the surface of the phosphor particle.

Therefore, the inventors created the phosphor particle in which there is not a large compositional difference between the surface region and the inside. However, they found that the created phosphor particle had a low initial luminous efficiency.

If the initial luminous efficiency does not satisfy the manufacturing standard, there is no point in minimizing the decrease of the luminance which is caused by the deterioration over time.

To the contrary, if the ratio of silicon in the phosphor is increased, the silicon is to be separated out on the surface of the phosphor as silica, and the deterioration resistance becomes low, whereas the luminous efficiency is improved.

In a conventional manufacturing method for the phosphor, the baking temperature is required to be lower than 1200° C. to satisfy $0<\beta-\alpha\leq0.5$ and $1.7\leq\beta$, namely, to manufacture a phosphor particle in which there is not a large compositional difference between the surface region and the inside.

If the baking temperature is lowered, it can be assumed that the valence of Mn included in the phosphor is increased. In other words, bivalent Mn increases and trivalent Mn decreases. Therefore, the crystallinity of the phosphor can be lowered.

However, it is now accepted that bivalent Mn mainly contributes to the light emission, and the higher luminous efficiency can be gained with higher crystallinity. Therefore, the low baking temperature causes the decrease of the luminous efficiency.

As a result of a keen examination, the inventors found that even if the baking temperature is high, it is possible to manufacture a phosphor particle that satisfies $0<\beta-\alpha\leq0.5$ and $1.7\leq\beta$, namely, a phosphor particle in which there is not a large compositional difference between the surface region and the inside, by lowering the temperature without introducing outside air into the baking oven.

This manufacturing method can increase the ratio of the bivalent Mn to heighten the initial luminance, and manufacture a phosphor that is resistant to the deterioration over time caused by ultraviolet rays.

4. Manufacturing Method for Green Phosphor Particles (1) Material Mixing Process As a source material of manganese (hereinafter called the "Mn material") for $ZnSiO_4$:Mn, high-purity manganese oxide (not less than 99% purity) may be used.

In addition to a method that uses the manganese oxide directly, an indirect method may be used, in which high-purity manganese hydroxide, manganese carbonate, manganese nitrate, manganese halide, manganese oxalate, or the like (not less than 99% purity) is used as an initial material, and manganese oxide is indirectly acquired through the baking process included in the manufacturing process.

As a source material of zinc (hereinafter called the "Zn material") for $ZnSiO_4$:Mn, high-purity zinc oxide (not less than 99% purity) may be used.

As described above, in addition to a method that uses the zinc oxide directly, an indirect method may be used, in which high-purity zinc hydroxide, zinc carbonate, zinc nitrate, zinc halide, zinc oxalate, or the like (not less than 99% purity) is used as an initial material, and zinc oxide is indirectly acquired through the baking process included in the manufacturing process.

As a source material of silicon (hereinafter called the "Si material") for ZnSiO$_4$:Mn, high-purity silicon dioxide (not less than 99% purity) may be used.

Also, hydroxide of silicon such as ethyl silicate, which can be acquired by hydrolyzing a silicon alkoxide compound, may be used.

The following is specific mixing quantity of each material for the phosphor:

MnCo$_3$ 0.10 mol
ZnO 1.90 mol
SiO$_2$ 1.00 mol

A V-type mixer, an agitator or the like, which is commonly used in industries, may be used for mixing the Mn material, the Zn material, and the Si material. A ball mill, a vibratory, a jet mill or the like, which has a crushing function, may be used as well.

The mixed powder of the phosphor materials can be obtained as described above.

(2) Baking Process

Figure 3:
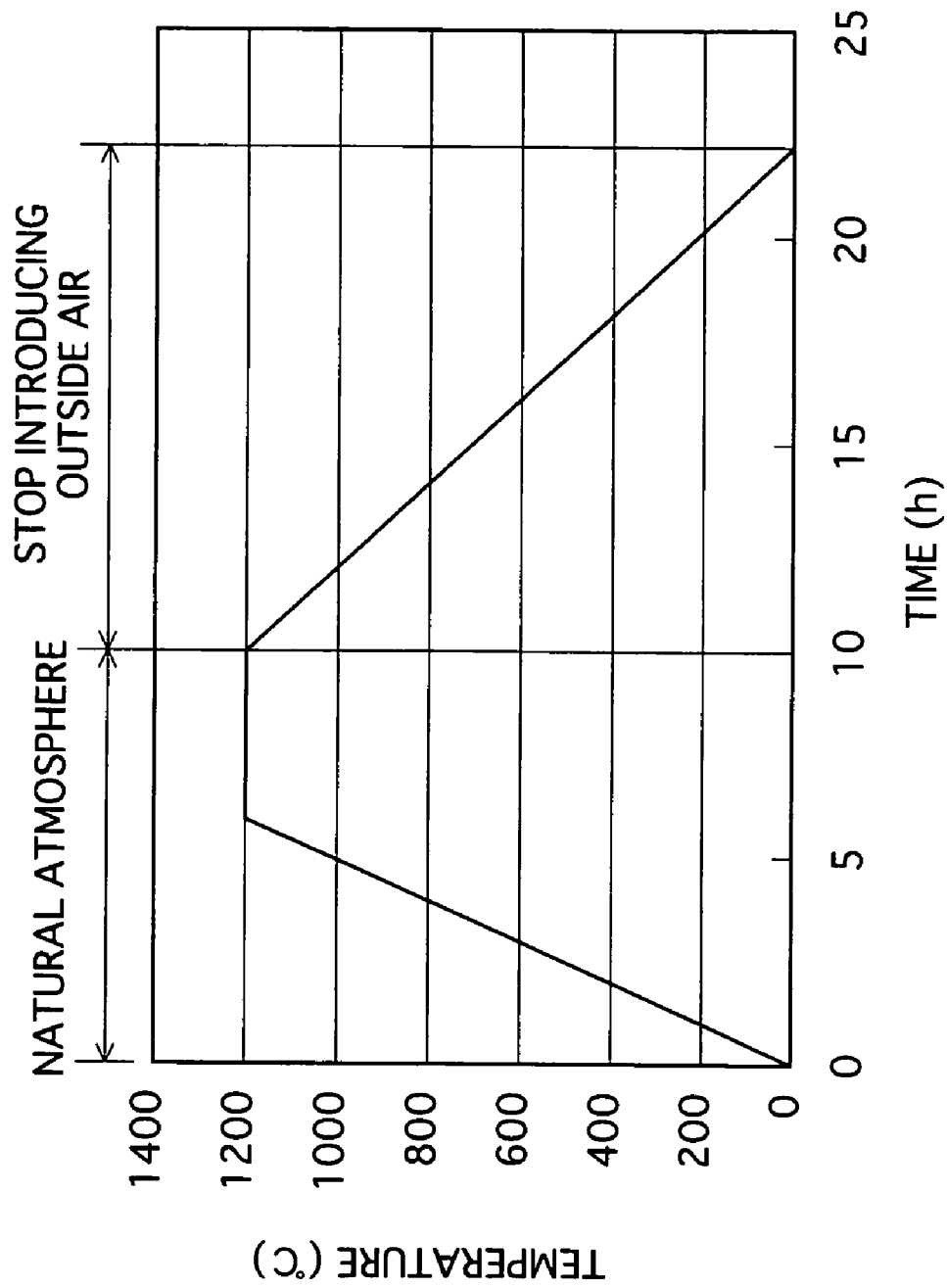
FIG. 3 shows temperature conditions of a baking process for a phosphor particle according to an embodiment of the present invention.

FIG. 3 is an example temperature profile of the baking oven that is used for the baking process. The temperature is gradually increased in the natural atmosphere, and the temperature reaches the maximum temperature of 1200° C. 6 hours after the baking is started. Then, the baking is performed for 4 hours at the maximum temperature.

After that, gradually decrease the temperature in 12 hours without introducing outside air into the baking oven, instead of decreasing in the natural atmosphere.

Here, the 1200° C. is set as the baking temperature and 6 hours are taken for the baking. However, needless to say, the baking temperature, the baking time, and so on are required to be adjusted to optimum values, depending on the radius of each material particle, the shape of silica (SiO$_2$), and so on.

Strictly speaking, to realize the designed overall Zn/Si ratio, the compounding ratio of the SiO$_2$ is required to be adjusted upward or downward from the above-described 1.00 mol.

Further, to realize the designed difference between the surface Zn/Si ratio and the overall Zn/Si ratio, the baking temperature during the baking process and the baking atmosphere are required to be modified.

Incidentally, if the baking is performed in the natural atmosphere, it is necessary to set the baking temperature lower than 1200° C. to decrease the difference between the surface Zn/Si ratio and the overall Zn/Si ratio. If this is the case, in addition to that the crystallinity becomes low, the bivalent Mn decreases and the trivalent Mn increases. Accordingly, the luminance becomes low.

As a result of a keen examination, the inventors found that the baking should be performed without introducing outside air into the baking oven to decrease the difference between the surface Zn/Si ratio and the overall Zn/Si ratio with keeping the ratio of the bivalent Mn.

The particulate manganese-activated zinc silicate phosphor of the present invention can be manufactured by the above-described method.

5. Manufacturing Method for Phosphor Ink

Firstly, mix 30 wt % of the green phosphor, in which each particle is modified by sieving or the like to have 2 µm of radius on average, 4.5 wt % of ethyl cellulose (molecular weight: approximately 200,000), and 65.5 wt % of a solvent (butyl carbitol acetate).

The viscosity of the phosphor ink is preferably adjusted to approximately 2000 to 6000 cps in final form so that the phosphor ink adheres strongly to the barrier ribs 114.

After applying the modified phosphor ink to the barrier rib channel by the meniscus method, dry and bake the phosphor ink at 500° C. for approximately 10 minutes, and form the phosphor layer 115.

Of course, the components of the phosphor ink are not limited to those described above.

Also, other methods (e.g. linejet method) may be used to apply the phosphor ink.

6. Evaluation Test of Deterioration

The inventors conducted a test to evaluate the deterioration of the manganese-activated zinc silicate phosphor according to the embodiment of the present invention.

The following describes the details of the test.

Method for Evaluating Deterioration of Phosphor

The phosphor particle was irradiated with vacuum ultraviolet light (VUV) with a wavelength of 146 nm to be deteriorated.

The luminance of each test sample is measured as a relative luminance that is relative to the initial luminance 100 (criterion) of a conventional phosphor (comparative sample 1, which is described later.).

For each test sample, a relative luminance A of the sample in the initial state, and a relative luminance B of the sample which had been irradiated with vacuum ultraviolet light for 100 hours, were measured. A value acquired by dividing the luminance B by the luminance A and multiplying the result by 100 is defined as a luminance maintenance ratio (%).

When the luminance maintenance ratio was not less than 80% (preferably not less than 85%), we judged the test sample to be effective for reducing the deterioration of the phosphor in the PDP over time.

Specification of Each Test Sample and Test Results

Table.1 shows the composition of each phosphor included in practical samples 1 to 7 and comparative samples 1 to 3, and the test results.

The following test samples, namely the practical samples and the comparative samples, are prepared by modifying the surface Zn/Si ratio and the overall Zn/Si ratio for each.

TABLE 1

| | Composition of Phosphor | | | Results of Deterioration Test | | |
|---|---|---|---|---|---|---|
| | | | | | Relative | |
| | Surface Zn/Si Ratio (α) | Overall Zn/Si Ratio (β) | Difference (β−α) | Initial Relative Luminance [%] | Luminance After 100 h [%] | Maintenance Ratio [%] |
| Comparative Sample 1 | 0.91 | 1.92 | 1.01 | 100 criterion | 74 | 74.0 |

TABLE 1-continued

|  | Composition of Phosphor | | | Results of Deterioration Test | | |
| --- | --- | --- | --- | --- | --- | --- |
|  | Surface Zn/Si Ratio (α) | Overall Zn/Si Ratio (β) | Difference (β−α) | Initial Relative Luminance [%] | Relative Luminance After 100 h [%] | Maintenance Ratio [%] |
| Comparative Sample 2 | 1.11 | 1.72 | 0.61 | 98 | 75 | 76.5 |
| Comparative Sample 3 | 1.19 | 1.61 | 0.42 | 99 | 77 | 77.8 |
| Practical Sample 1 | 1.90 | 1.91 | 0.01 | 100 | 90 | 90.0 |
| Practical Sample 2 | 1.22 | 1.69 | 0.47 | 102 | 82 | 80.4 |
| Practical Sample 3 | 1.41 | 1.74 | 0.33 | 103 | 88 | 85.4 |
| Practical Sample 4 | 1.68 | 1.80 | 0.12 | 98 | 85 | 86.7 |
| Practical Sample 5 | 1.81 | 2.02 | 0.21 | 95 | 85 | 89.5 |
| Practical Sample 6 | 1.99 | 2.00 | 0.01 | 90 | 81 | 90.0 |
| Practical Sample 7 | 2.00 | 2.11 | 0.11 | 87 | 80 | 92.0 |

The composition of the practical sample 1 is the same as the composition of the phosphor described in the embodiment. The composition of the comparative sample 1 is the same as the composition of the conventional phosphor.

Each phosphor of the practical samples 1 to 7 and the comparative samples 1 to 3 is manufactured based on the ratios of the zinc oxide and the silicon dioxide shown in the description of the material mixing process and the baking conditions shown in the description of the baking process.

As Table.1 shows, regarding each of the practical samples 1 to 7, the difference between the surface Zn/Si ratio and the overall Zn/Si ratio is equal to or less than 0.5, the overall Zn/Si ratio is equal to or more than 1.7, and the luminance maintenance ratio is equal to or more than 80%.

In contrast, regarding each of the comparative samples 1 to 2, although the overall Zn/Si ratio is equal to or more than 1.7, the difference between the surface Zn/Si ratio and the overall Zn/Si ratio is more than 0.5 and the luminance maintenance ratio is less than 80%.

Also, regarding the comparative sample 3, although the difference between the surface Zn/Si ratio and the overall Zn/Si ratio is equal to or less than 0.5, the overall Zn/Si ratio is less than 1.7 and the luminance maintenance ratio is less than 80%.

Among the practical samples 1-7, especially regarding the practical sample 2, in which the difference between the surface Zn/Si ratio and the overall Zn/Si ratio is more than 0.3, the luminance maintenance ratio is 80%. Meanwhile, regarding each of the practical samples 1 and 3 to 7, in which the difference between the surface Zn/Si ratio and the overall Zn/Si ratio is equal to or less than 0.3 and the overall Zn/Si ratio is equal to or more than 1.7, the luminance maintenance ratio is equal to or more than 85%.

Therefore, the luminance maintenance ratio can be improved by setting the difference between the surface Zn/Si ratio and the overall Zn/Si ratio to be not more than 0.3.

As described above, high luminance maintenance ratio not less than 80% can be gained by setting the difference between the surface Zn/Si ratio and the overall Zn/Si ratio to be equal to or less than 0.5 and the overall Zn/Si ratio to be equal to or more than 1.7.

Particularly, it is found that when the overall Zn/Si ratio is equal to or less than 2.0, the initial luminance becomes not less than 90% of the initial luminance of the comparative sample 1. This satisfies the initial performance standard.

7. Evaluation Test for Actual Equipment

FIG. 4 shows a change of the luminance maintenance ratio (%) over time while PDPs are driven. In one of the PDPs, the phosphor layer 115 is formed using the phosphor of the practical sample 1, and in the other, the phosphor layer 115 is formed using the phosphor of the comparative sample 1.

In this test, the PDPs display only the green color statically.

As FIG. 4 shows, in the PDP using the green phosphor according to the embodiment, the deterioration of the luminance over time is reduced and the high image quality is maintained compared to the conventional PDP.

On the other hand, in the conventional PDP, the ratio of the deterioration of the luminance over time is high and the initial color balance realized by each phosphor is disrupted over the driving time. This causes a so-called burn-in, which is a phenomenon where an afterimage of a specific color (an image in which the green color is impaired) is displayed just like the image is burned in.

Details of Measuring Method used in Evaluation Test of Deterioration (1) Method Used for Obtaining Composition Ratio in Surface Region of Phosphor Particle X-ray photoelectron spectroscopy using AlKα X-ray radiation is used as a method for obtaining the composition ratio in the surface region of the phosphor particle, namely the surface Zn/Si ratio. (This method is hereinafter called the "XPS method".)

More specifically, AlKα radiation is used as an illuminating X-ray in the XPS method, and energy of the photoelectrons is to be measured.

The value of the energy measured by the XPS method indicates information about chemical elements that exist in a region up to 4 nm in depth from the surface of the sample. Also, a relative sensitivity factor as to each element included in the radiated object is publicly known. According to those facts, the relative number of the silicon atoms in the surface region of the phosphor particle is calculated from a photoelectron peak area based on a 2p orbital of silicon. Then, the ratio to the relative number of the zinc atoms in the surface region of the phosphor particle, namely the surface Zn/Si ratio, is calculated from a photoelectron peak area based on a 2p3 orbital of zinc.

(2) Method Used for Obtaining Composition Ratio in Whole Phosphor Particle

Inductively coupled plasma atomic emission spectrometry (ICP-AES) is used as a method for obtaining the composition ratio in the whole phosphor particle, namely the overall Zn/Si ratio.

More specifically, in the ICP-AES, samples are dissolved with an acid or an alkali, and then the chemical elements exist in the solution are atomized and excited by being sprayed in a plasma. The ICP-AES utilize a phenomenon where each element obtained in the above-described manner emits unique light at the time of transition to a lower energy level.

In other words, the overall Zn/Si ratio is obtained by measuring the wavelength and the strength of such a light.

Note that a titration method, inductively coupled plasma mass spectrometry, a fluorescent X-ray method or the like may be used for obtaining the composition ratio in the whole phosphor particle in stead of the ICP-AES. However, different values are obtained by different methods. In the embodiment, the overall Zn/Si is based on the measurement result by the ICP-AES.

Also, the surface Zn/Si in the embodiment is based on the measurement result by the XPS method.

Supplementary Explanations

In the embodiment, the amount of manganese that is used for the activation is 1.1 mol for every 1 mol of the phosphor. However, the amount is not limited to 1.1 mol as long as it is a normal amount used for a phosphor.

Generally, if the amount of manganese is insufficient, the persistence time will become long. To the contrary, if the amount of the manganese is excessive, the luminous efficiency will be lowered. Therefore, the amount of the manganese should be in a range where such problems do not occur (preferably 0.01 to 0.2 mol for very 1 mol of the phosphor).

In the above-described embodiment, the PDP is taken as an example and the phosphor used for the PDP is described. However, needless to say, the phosphor described in the embodiment may be used for discharge light emitting devices, such as fluorescent lamps, to gain the same effect.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A manganese-activated zinc silicate phosphor, wherein $0 < \beta - \alpha \leq 0.5$ and $1.7 \leq \beta$, where a value $\alpha$ is a ratio of a number of zinc atoms to a number of silicon atoms in a surface region of a phosphor particle, including a surface of the phosphor particle and a vicinity thereof, and a value $\beta$ is a ratio of a number of zinc atoms to a number of silicon atoms in a whole of the phosphor particle.

2. The manganese-activated zinc silicate phosphor of claim 1, wherein the value $\alpha$ is obtained by X-ray photoelectron spectroscopy using AlKα X-ray radiation, and the value $\beta$ is obtained by inductively coupled plasma atomic emission spectrometry.

3. The manganese-activated zinc silicate phosphor of claim 2, wherein the surface region is up to 4 nm in depth from the surface.

4. The manganese-activated zinc silicate phosphor of claim 3, wherein $\beta - \alpha \leq 0.3$.

5. The manganese-activated zinc silicate phosphor of claim 4, wherein $\beta \leq 2.0$.

6. A gas discharge display device comprising a green phosphor, wherein the green phosphor includes a plurality of phosphor particles, at least some of the phosphor particles are manganese-activated zinc silicate phosphor particles, and $0 < \beta - \alpha \leq 0.5$ and $1.7 \leq \beta$, where a value $\alpha$ is a ratio of a number of zinc atoms to a number of silicon atoms in a surface region of each manganese-activated zinc silicate phosphor particle, including a surface of the manganese-activated zinc silicate phosphor particle and a vicinity thereof, and a value $\beta$ is a ratio of a number of zinc atoms to a number of silicon atoms in a whole of the manganese-activated zinc silicate phosphor particle.

* * * * *